Patented Jan. 25, 1944

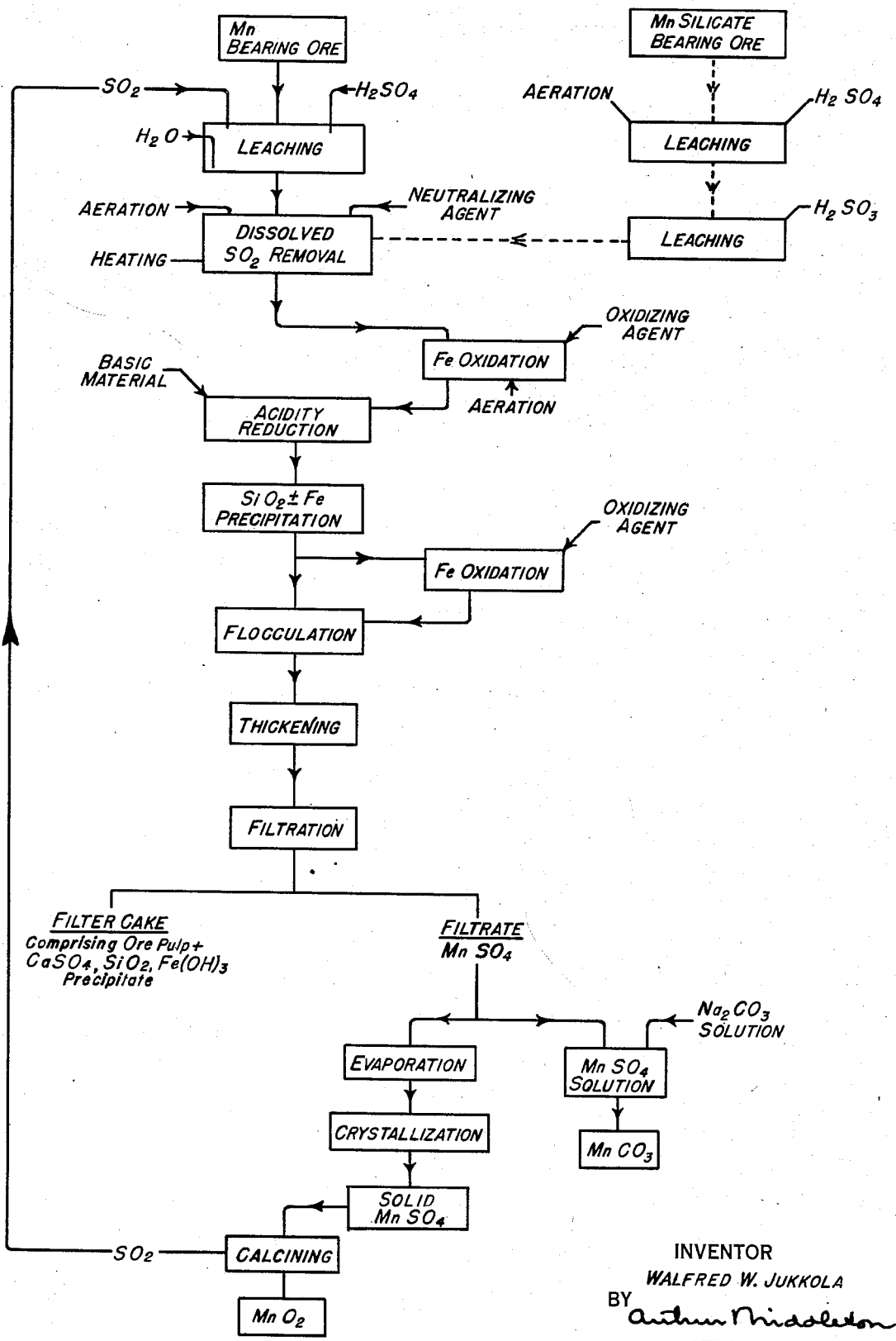

2,340,188

UNITED STATES PATENT OFFICE 2,340,188

MANGANESE ORE TREATMENT

Walfred W. Jukkola, Westport, Conn., assignor to The Dorr Company, Inc., New York, N. Y., a corporation of Delaware Application March 25, 1942, Serial No. 436,193

12 Claims. (Cl. 75—115)

This invention relates to a method for recovering manganese from ores containing it. More particularly, it has to do with the treatment of ores wherein the manganese is associated with difficultly removable constituents.

Manganese is a strategically important metal, especially in connection with steel making operations. It is used not only for scavenging and deoxidizing purposes but also for actual alloying with steel to produce products having special properties. Manganese is, most commonly, employed as ferro-manganese for steel producing purposes.

Deposits of manganese ores exist in the United States in which the manganese is primarily present in the form of the oxide admixed or associated with such difficultly removable constituents as iron oxides, silica, alumina and phosphorus. Such deposits are found in the Olympic Mountains located in the State of Washington. In this region there are also deposits wherein the contained manganese in the ore is largely present in the form of the silicate admixed with other manganese compounds. While these domestic ores carry a manganese content sufficiently high for commercial exploitation they have not been utilized heretofore because of the lack of an efficient and practical method of extraction.

Accordingly, an object of the present invention is to provide a method whereby manganese is recovered from domestic manganese bearing ores in an available form suitable for ready conversion to various commercial uses.

Another object of the present invention is to provide a method whereby manganese is recovered from manganese bearing ores in a form suitable for facile conversion to various commercial uses with the attendant separation of the difficultly removable constituents.

A further object of the present invention is to provide a method for recovering manganese from manganese bearing ores which results in a product having a given amount of iron derived from the ore associated with the manganese, the iron and manganese being present in a form suitable for ready conversion to various commercial uses.

A further object of the present invention is to provide a method for recovering manganese from domestic ores bearing it in a simple, expedient and practical manner.

A further object of the present invention is to provide a method for recovering manganese from ores bearing it wherein the silica is caused to be separated out of the manganese bearing solution in an easily filtrable form.

A further object of the present invention is to provide a method for recovering manganese from manganese bearing ores wherein the silica is caused to be separated out of the manganese bearing solution containing free acid through the medium of a precipitate formed upon reaction of such acid with a basic material introduced into said solution to reduce its degree of acidity.

A still further object of the present invention is to provide a method for recovering manganese from manganese bearing ores in which the iron content of the ore is oxidized to the ferric state.

A still further object of the present invention is to provide a method for recovering manganese from manganese bearing ores wherein the iron content is precipitated out of the manganese bearing solution as a ferric iron compound.

Other and further objects will be apparent as the invention is described in greater detail in connection with the accompanying drawing illustrating a flow sheet for the method for recovering manganese from ores containing it.

Referring to the drawing, manganese bearing ore is subjected to a leaching operation, such ore being preferably ground or otherwise reduced to particles of suitable size. Although the size of the particles is not critical, the finer the state of subdivision the more rapid and thorough is the action of the acidic reagents employed in the leaching operation.

The leaching operation is carried out in two stages with an acidic reagent capable of dissolving the manganese out of the ore and forming a manganese compound solution, such reagent being of the class including sulfur dioxide and sulfuric acid. In the one stage the ore is intimately contacted with sulfur dioxide in the presence of water while in the other stage it is subjected to the action of both sulfur dioxide and sulfuric acid. Preferably, the ore particles are suspended in water and while so suspended are caused to intimately contact with sulfur dioxide gas, this contact being continued for a predetermined time, whereupon sulfuric acid is introduced into the mass and the mass subjected for a further predetermined time to the combined action of sulfur dioxide and sulfuric acid. While the two stage treatment in the manner described is preferred, it is to be understood that the ore pulp can be subjected to either the action of both sulfur dioxide and sulfuric acid simultaneously or to the action of sulfuric acid followed by sulfur dioxide with equally good results. The reagents, sulfur dioxide and sulfuric acid, are employed in such quantities that the resulting leached mass shall have an acidity corresponding to a pH value of between 1.0 to 2.5. The leaching operation is preferably performed at atmospheric pressure and a temperature from 25° C. to 50° C.

The ore pulp mass resulting from the leaching operation includes the manganese in the form of manganese sulfate solution, the iron content as ferrous sulfate, silica in a dissolved and dispersed state, together with phosphorus and alumina. Such mass is next treated so as to remove the dissolved sulfur dioxide. This may be effected by either boiling the mass until all of the $SO_2$ has been driven off or by subjecting the mass to an aeration with compressed air for a time sufficient to eliminate the dissolved $SO_2$. If desired, the dissolved $SO_2$ may be removed by adding to the mass a substance capable of reacting with the $SO_2$. Such substance may be either manganese dioxide or ore with a high $MnO_2$ content. By continuing the aeration beyond the $SO_2$ removal point or employing more $MnO_2$ than is required to satisfy the dissolved $SO_2$ it is possible to oxidize the ferrous iron to the ferric state in whole or in part. In other words, both of these steps serve the double purpose of removing the excess $SO_2$ and oxidizing the ferrous iron to the ferric state. On the other hand, the mass can be subjected to the aeration for the removal of the dissolved $SO_2$ and then to the action of $MnO_2$ in amount sufficient to effect oxidation in whole or in part of the ferrous iron to the ferric state. Thus, by proper manipulation of these two steps the amount of iron to be removed in the subsequent separation step can be controlled. Preferably, the ore pulp mass is subjected to either one of the three foregoing described procedures for the sole removal of the dissolved $SO_2$.

The ore pulp mass with the dissolved $SO_2$ removed and having excess of sulfuric acid therein is next treated so as to cause the separation of the difficultly removable materials including silica, alumina and phosphorus from the manganese sulfate solution. This is accomplished by adding to the mass a basic material capable of forming a precipitate upon reaction with such excess sulfuric acid, the basic material employed being selected from the group comprising calcium oxide, calcium hydroxide, calcium carbonate, or the like. The addition of such basic material is continued until the acidity of the mass has been reduced to that corresponding to a pH value of between 4.5 to 5.2. When the acidity has been reduced to the pH range calcium sulfate in the form of flocs carrying occluded silica is precipitated out of the manganese sulfate solution. This pH range is critical for within such range there is a complete separation of the silica. Associated with the $CaSO_4$ precipitate is the alumina and phosphorus. The separation treatment is carried out at a temperature from 20° C. to 100° C., preferably 85° C.

Should the mass carrying the calcium sulfate precipitate contain iron in the ferrous state, it is next treated so as to oxidize the iron to the ferric state. This can be effected by contacting the mass with an oxidizing agent like manganese dioxide $MnO_2$ in sufficient amount and period of time to oxidize such ferrous iron to the ferric state. Such oxidation causes the iron to be thrown out of the manganese solution as a ferric hydroxide precipitate and be deposited in and about the calcium sulfate precipitate.

If desired, all of the iron content may be separated from the mass simultaneously with the calcium sulfate precipitation. To do this, the ore pulp mass immediately following the dissolved $SO_2$ removal is caused to undergo an oxidation by either subjecting it to an aeration employing compressed air for a sufficient time or to the action of an oxidizing agent manganese dioxide in sufficient amount and time to convert all of the ferrous iron to the ferric state. The mass with the iron content converted to the ferric state is then treated to the separation step previously described whereupon the ferric iron as ferric hydroxide will be precipitated out of the manganese sulfate solution along with the flocs of $CaSO_4$ precipitate.

In some instances, it may be desirable to oxidize only a portion of the iron content of the ore pulp mass to the ferric state intermediate the dissolved $SO_2$ removal and $CaSO_4$ precipitation steps, and oxidize the remaining portion of such iron content directly following the $CaSO_4$ precipitation. If this procedure is followed the portion of the iron content will be precipitated as ferric hydroxide simultaneously with the $CaSO_4$ precipitate in the separation step while the other portion of the iron content will be thrown out of the manganese sulfate solution as ferric hydroxide precipitate and be deposited upon the $CaSO_4$ precipitate.

Upon completion of the ferric oxidation step the mass is subjected to a flocculation operation which is preferably carried out in an apparatus known by the trade-mark "Flocculator" and made by The Dorr Company, Inc., of New York, N. Y. By this mechanical flocculation the precipitation or occlusion of the silica within the flocked calcium sulfate precipitate is facilitated.

At the conclusion of the flocculation, the mass is next subjected to a thickening or dewatering operation. This is preferably performed in a thickener.

Following the thickening operation the ore pulp mass is treated to a filtration operation. This is done preferably by vacuum filtration. By such filtration the manganese sulfate solution in substantially pure state passes through the filter as the filtrate while the filter cake comprising the gangue and calcium sulfate and ferric hydroxide precipitates carrying the occluded silica is retained upon the filter. Under the above conditions, any alumina and phosphorus present in the solutions are also precipitated and the cake, therefore, will have interspersed throughout any such alumina and/or phosphorus.

The filtrate of manganese sulfate thus obtained may be converted into manganese carbonate by causing it to react with a solution of sodium carbonate. If desired, the manganese in such filtrate may be recovered as pure manganese oxide, mostly $Mn_3O_4$, by first subjecting the solution to an evaporation operation, then to a crystallization and finally to a calcination. The $SO_2$ liberated during the calcining operation is returned to the $SO_2$ supply for reuse in the leaching step of the method.

Where the ore to be treated is one in which the contained manganese is largely present in the form of a silicate admixed with other compounds of manganese, such ore is caused to undergo a two stage leaching operation as indicated by the dotted lines in the flow sheet. This ore, preferably in a finely divided state of subdivision, is first subjected to the action of sulfuric acid and continuous aeration with compressed air for a predetermined period of time, and then to the action of sulfurous acid without aeration for a further predetermined period. The sulfuric and sulfurous acids are each preferably used in such quantities as to give to the mass upon completion of the leaching operation an acidity corresponding to a pH value of between 1.5 and 2.5. The leaching operations are carried out at atmospheric pressure and at a temperature of about 70° C. The thus leached mass is then subjected to the same dissolved $SO_2$ removal and the succeeding steps of the method previously described.

Various specific details of procedure and conditions of operation have been set forth above for the purpose of giving a clear understanding of the method, but the invention is not limited to the exact details given, as it includes modifications and changes coming within the scope of the appended claims.

Having thus described the invention, what is claimed as new and desired to be secured by Letters Patent is:

1. In the method for recovering manganese from manganese bearing ores containing silica, the step of treating an ore pulp mass including a sulfuric acid containing manganese sulfate solution which contains silica in a dissolved and dispersed state with a basic material capable of forming a precipitate upon reaction with said acid in such amount as to only partially neutralize said acid to thereby cause the precipitate formed by reaction of the basic material with said acid and carrying the silica interspersed therewith to be thrown out of said solution.

2. In the method for recovering manganese from manganese bearing ores containing silica, the step of treating an ore pulp mass including sulfuric acid containing manganese sulfate solution which contains silica in a dissolved and dispersed state with a basic material capable of forming a precipitate upon reaction with said acid in such amount as to neutralize said acid to a degree such that the acidity of said solution corresponds to a pH value of between 4.5 and 5.2 to thereby cause the precipitate formed by reaction of the basic material with said acid and carrying the silica interspersed therewith to be thrown out of said solution.

3. In the method for recovering manganese from manganese bearing ores containing silica, the step of treating an ore pulp mass including sulfuric acid containing manganese sulfate solution which contains silica in a dissolved and dispersed state with a basic material capable of forming a precipitate upon reaction with said acid and selected from the group consisting of calcium oxide, calcium hydroxide, calcium carbonate, in such amount as to neutralize said acid to a degree such that the acidity of said solution corresponds to a pH value between 4.5 and 5.2 to thereby cause the $CaSO_4$ precipitate formed by reaction of the selected calcium compound with said acid and carrying the silica interspersed therewith to be thrown out of said solution.

4. In the method for recovering manganese from manganese bearing ores containing silica, the steps of treating an ore pulp mass including a sulfuric acid containing manganese sulfate solution which contains silica in a dissolved and dispersed state with a basic material capable of forming a precipitate upon reaction with which acid in such amount as to neutralize said acid to a degree such that the acidity of said solution corresponds to a pH value of between 4.5 and 5.2 to thereby cause the precipitate formed by reaction of the basic material with said acid and carrying the silica interspersed therewith to be thrown out of said solution, and flocculating the mass to facilitate the throwing out of the precipitate carrying silica from the solution.

5. In the method for recovering manganese from manganese bearing ores containing silica, the steps of treating an ore pulp mass including a sulfuric acid containing manganese sulfate solution which contains silica in a dissolved and dispersed state with a basic material capable of forming a precipitate upon reaction with said acid and selected from the group consisting of calcium oxide, calcium hydroxide, calcium carbonate, in such amount as to neutralize said acid to a degree such that the acidity of said solution corresponds to a pH value of between 4.5 and 5.2 to thereby cause the $CaSO_4$ precipitate formed by reaction of the selected calcium compound with said acid and carrying the silica interspersed therewith to be thrown out of said solution, and mechanically flocculating said mass to facilitate the throwing out of the $CaSO_4$ precipitate carrying silica from said solution.

6. In the method for recovering manganese from manganese bearing ores containing silica, the steps of forming an ore pulp mass including a free acid containing manganese sulfate solution which contains silica in a dissolved and dispersed state and having an acidity corresponding to a pH value of between 1.0 and 2.5, and treating said mass with a basic material capable of forming a precipitate upon reaction with said acid in an amount such as to reduce its acidity corresponding to a pH value of between 4.5 and 5.2 to thereby cause the precipitate formed by reaction of the basic material with said acid and carrying the silica interspersed therewith to be thrown out of said solution.

7. In the method for recovering manganese from manganese bearing ores containing silica, the steps of forming an ore pulp mass including a free sulfuric acid containing manganese sulfate solution which contains silica in a dissolved and dispersed state and having an acidity corresponding to a pH value of between 1.0 and 2.5, and treating said mass with a basic material selected from the group consisting of calcium oxide, calcium hydroxide, calcium carbonate, and capable of forming a precipitate upon reaction with said sulfuric acid in an amount such as to reduce its acidity corresponding to a pH value of between 4.5 and 5.2 to thereby cause the $CaSO_4$ precipitate formed by reaction of the selected calcium compound with said acid and carrying the silica therewith to be thrown out of said solution.

8. In the method for recovering manganese from manganese bearing ores containing silica and iron, the steps of treating an ore pulp mass including a free acid containing solution of manganese and ferrous sulfates having the silica dissolved and dispersed therein with a basic material capable of forming a precipitate upon reaction with said acid in such amount as to neutralize said acid to a degree such that the acidity of said solution corresponds to a pH value of between 4.5 and 5.2 to thereby cause the precipitate formed by reaction of the basic material with said acid and carrying the silica interspersed therewith to be thrown out of said solution, and subjecting said mass to an oxidation to convert said ferrous compound to the ferric state to thereby cause precipitation of the ferric compound out of said solution.

9. The method for recovering manganese from manganese bearing ores containing iron and silica which comprises treating the ore suspended in an aqueous medium with sulfur dioxide and sulfuric acid as to dissolve the manganese out of the ore and form a mass including a free acid containing solution of manganese and ferrous sulfates having the silica dissolved and dispersed therein, the sulfur dioxide and sulfuric acid being employed in such quantities as to give to said mass an acidity corresponding to a pH value of between 1.0 and 2.5, subjecting said mass to an oxidation to convert the ferrous sulfate to the ferric state, and treating said mass with a basic material capable of forming a precipitate upon reaction with said free acid in an amount such as to reduce its acidity corresponding to a pH value of between 4.5 and 5.2 to thereby cause the precipitate formed by reaction of the basic material with said acid and carrying the silica interspersed therewith together with a ferric compound precipitate to be thrown out of said solution.

10. The method for recovering manganese from manganese bearing ores containing iron and silica which comprises treating the ore suspended in an aqueous medium with sulfur dioxide and sulfuric acid as to dissolve the manganese out of the ore and form a mass including a free acid containing solution of manganese and ferrous sulfates having the silica dissolved and dispersed therein, the sulfur dioxide and sulfuric acid being employed in such quantities as to give to said mass an acidity corresponding to a pH value of between 1.0 and 2.5, treating said mass with a basic material capable of forming a precipitate upon reaction with said free acid in an amount such as to reduce its acidity corresponding to a pH value between 4.5 and 5.2 to thereby cause the precipitate formed by reaction of the basic material with said acid and carrying the silica interspersed therewith to be thrown out of said solution, and subjecting said mass to an oxidation to convert the ferrous sulfate to the ferric state, thereby causing the ferric compound to be precipitated out of said solution.

11. The method for recovering manganese from manganese bearing ores containing iron and silica which comprises treating the ore with an acidic reagent as to dissolve the manganese out of the ore and form a mass including a solution of manganese and ferrous sulfates having the silica dissolved and dispersed therein, the reagent being employed in such quantity as to give to said mass an acidity corresponding to a pH value of between 1.0 and 2.5, treating said mass to an oxidation to convert the ferrous compound to the ferric state, treating said mass with a basic material capable of forming a precipitate upon reaction with said reagent in such amount as to reduce its acidity corresponding to a pH of between 4.5 and 5.2 to thereby cause the precipitate formed by reaction of the basic material with said reagent and carrying the silica interspersed therewith together with a precipitate of the ferric compound to be thrown out of said solution, and recovering a purified manganese compound solution.

12. The method for recovering manganese from manganese bearing ores containing iron and silica which comprises treating an ore pulp mass including a free acid containing solution of manganese and ferrous sulfates having the silica dissolved and dispersed therein with a basic material capable of forming a precipitate upon reaction with said acid in such amount as to neutralize said acid to a degree such that its acidity corresponds to a pH value of between 4.5 and 5.2 to thereby cause the precipitate formed by reaction of the basic material with said acid and carrying the silica interspersed therewith to be thrown out of said solution, subjecting said mass to an oxidation of such character as to convert only a predetermined amount of said ferrous compound to the ferric state to thereby cause precipitation of the ferric compound out of said solution, and recovering a manganese and ferrous compounds containing solution.

WALFRED W. JUKKOLA.